United States Patent
Jenkins et al.

(10) Patent No.: US 7,444,426 B2
(45) Date of Patent: Oct. 28, 2008

(54) METHOD FOR SELECTING A RESOURCE TO PROVIDE A REQUESTED SERVICE IN A MULTICASTING ENVIRONMENT

(75) Inventors: Tim Jenkins, Kinburn (CA); Sejal Patel, Kanata (CA)

(73) Assignee: Ciena Corporation, Linthicum, MD (US)

( * ) Notice: Subject to any disclaimer, the term of this patent is extended or adjusted under 35 U.S.C. 154(b) by 804 days.

(21) Appl. No.: 10/773,085

(22) Filed: Feb. 4, 2004

(65) Prior Publication Data

US 2004/0221029 A1    Nov. 4, 2004

(30) Foreign Application Priority Data

Feb. 11, 2003 (CN) .................................... 2418729

(51) Int. Cl.
*G06F 15/173* (2006.01)
(52) U.S. Cl. ...................................................... 709/238
(58) Field of Classification Search ................ 709/238, 709/223, 227, 230
See application file for complete search history.

(56) References Cited

U.S. PATENT DOCUMENTS 6,148,210 A * 11/2000 Elwin et al. .................. 455/453
7,027,417 B1 * 4/2006 Verkama et al. ............. 370/329
2004/0111470 A1 6/2004 Poulsen et al.
2004/0117503 A1 6/2004 Nguyen et al.
2004/0132448 A1 7/2004 Torres et al.

OTHER PUBLICATIONS

Fenner, W., Internet Group Management Protocol, Version 2, Xerox Parc, The Internet Society, Nov. 1997, pp. 1-22.
Cain, B., et al., Internet Group Management Protocol, Version 3, AT&T Labs—Research, The Internet Society, Oct. 2002, pp. 1-48.
Deering, S., Host Extensions for IP Multicasting, Stanford University Aug. 1989, pp. 1-16.
International Search Report for PCT/US04/03180 dated Aug. 17, 2004.

* cited by examiner

*Primary Examiner*—David Y Eng
(74) *Attorney, Agent, or Firm*—Merek, Blackmon & Voorhees, LLC

(57) ABSTRACT

A method is provided for selecting a resource from a plurality of potential resources in order to provide a service in response to a service request. The method comprises the following steps. Aging services are determined by estimating which of the resources are likely to become available. One of the aging services is disconnected from its resource. The resource is then used for providing the service in the service request. In accordance with a further aspect of the present invention, an oldest service is determined. The oldest service is defined as the service that is most likely to be disconnected from its resource. The oldest service is disconnected from its resource, which is then used for providing the service in the service request.

11 Claims, 4 Drawing Sheets

METHOD FOR SELECTING A RESOURCE TO PROVIDE A REQUESTED SERVICE IN A MULTICASTING ENVIRONMENT

CROSS-REFERENCES TO RELATED APPLICATIONS

This application claims priority from Canadian Patent Application No. 2,418,729, filed Feb. 11, 2003.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to multicasting and specifically to a method for selecting a resource from a plurality of multicasting resources for providing a desired service.

Multicasting allows one device on the Internet to send content to multiple other devices that have identified themselves as interested in receiving the originating device's content. One example of multicasting is a digital video distribution system for delivering digital video over Internet Protocol (IP) over Asynchronous Transfer Mode (ATM) over Digital Subscriber Line (DSL). Referring to FIG. 1, a digital video distribution system is represented generally by numeral 100. The distribution system 100 comprises a multicast capable broadband loop carrier (BLC) 102, a Plain Old Telephone System (POTS)/DSL loop 104, a DSL modem 106, and a plurality of set top boxes 108. The DSL modem 106 is coupled to each of the set top boxes via a local area network (LAN) 110. The distribution system 100 couples a media source 112 with a plurality of displays, or televisions 114. Generally each television 114 is coupled with an associated set top box 108, although multiple televisions 114 may be coupled to each set top box 108. Typically, the number of televisions 114 serviced at a customer premises is the same as a number of desired media streams for which the customer is subscribed. In the case of a digital video distribution system, the media streams comprise video feeds.

The media source transmits a plurality of source media streams via source virtual circuits (VCs) 118 to the multicast capable BLC 102. The multicast capable BLC 102, which typically combines the functionality of a Digital Loop Carrier (DLC), a Digital Subscriber Line Access Multiplexer (DSLAM), and a media gateway, transmits requested media streams to the DSL modem 106 via media VCs 116 in the POTS/DSL loop 104. Each DSL loop 104 may be provisioned with one or more media VCs 116. It is through the DSL modems 106 that the set top box, or boxes, 108 request the media streams. Thus, the multicast capable BLC 102 performs the multicast by connecting source media streams 118 to the media VCs 116 that are connected to the DSL modem 106.

Referring to FIG. 2, an alternate digital video distribution system to that shown in FIG. 1 is illustrated generally by numeral 200. The digital video distribution system 200 is similar that illustrated in FIG. 1, with the exception of an integrated set top box 202. The integrated set top box 202 performs the function of the DSL modem 106 and the set top box 108 of the system described in FIG. 1. Accordingly, the digital video distribution system 200 does not require the LAN 110.

Referring to both FIG. 1 and FIG. 2, digital video can be delivered to customers using DSL lines. Typically, customers are provisioned with multiple ATM VCs to carry the video stream. One VC is provisioned per video stream subscribed to by the customer, while additional VCs may be necessary for video stream control and other administrative use. Alternately, one VC is provisioned that comprises multiple video streams subscribed to by the customer.

An Internet Group Management Protocol (IGMP) is an Internet protocol that provides a way for Internet-connected devices to report their multicast group membership to adjacent routers. IGMP is often used to request specific video streams from the network. In order to achieve this, the set top box 108 reports group membership, where the group is a specific video stream. The IGMP protocol is designed to allow servers to be unaware of the exact number of clients that are members of a group. It is also designed such that group members do not report their own membership if they detect a peer in the same group. The result of these design characteristics is that if more than one set top box 108 is receiving the same video channel, not all of the available media VCs 116 are used. In contrast, when all set top boxes are receiving different video channels, all available media VCs 116 are used. The IGMP reduces bandwidth over the POTS/DSL loop 104 when possible, which is useful for reducing traffic on the network.

However, potential problems in the delivery of the video streams, and other multicast streams, can arise in both of the above described examples, depending on the disconnection mechanism used by the multicast BLC 102. Once a specific video stream is no longer desired, there are three primary methods for disconnecting the source video stream from the media VC 116 that is carrying it between the multicast capable BLC 102 and the DSL modem 106.

A first disconnecting method is referred to a normal, or slow, leave, and is described by IGMPv2, which is described in RFC 2236. Using this method, video streams do not immediately disconnect from their associated media VCs 116 when the set top box 108 sends an IGMP Leave message. Rather, in IGMPv2 and IGMPv3 (described in RFC 3376), the video streams only disconnect after a predefined time has elapsed. Functionally, the time is maintained by timers, which are initiated by the reception of the IGMP Leave message.

A second disconnecting method is referred to as a fast leave. In a fast leave, the video stream is disconnected from its associated media VC 116 as soon as the IGMP Leave message is received. The disconnection can be achieved in a proprietary manner or by setting the timers associated with reception of the normal IGMP Leave message to very short intervals, such as zero for example, with no retries.

A third disconnecting method is a time-out based on the lack of appearances of Membership Reports for a particular group. A time-out interval is based on the number of times a General Query has been sent on the interface used by the video stream. For IGMPv1, described in RFC 1112, no leave message is defined, thus this is the only available method of disconnection.

If the multicast capable BLC 102 is set to perform a fast leave on a single media VC 118 that is in use by multiple televisions 114, some subscribers may see a glitch in the video stream reception if one of the set top boxes 108 requests a leave. The glitch will likely occur because the multicast capable BLC 102 stops delivering the video stream immediately. Service is not restored for the original video stream until at least one of the set top boxes 108 that did not change video streams reports its membership.

If the multicast capable BLC 102 is set to perform a normal leave behaviour and all media VCs 116 are in use, a video stream change request may go unanswered due to the lack of availability of media VCs 116. For example, a typical user changes channels. This is realised by the set top box sending an IGMP Leave message followed by an IGMP Report message for the new video stream. However, due to normal IGMP Leave behaviour, the group just left has not been disconnected from the media VC. Since all other media VCs are in use, the Report for the new group is dropped.

Alternately, for the case where bandwidth is the resource, as opposed to a VC, the Report is answered, but excess bandwidth may be pushed down the line, degrading performance for all services until the group just left is disconnected.

Currently, there are several proposals to the above-described problems. In a first proposal, the number of VCs that are provisioned is one more than the number of set top boxes 108, and a normal leave is used. However, this method increases the administrative requirements and requires the permanent use of a media VC for transient conditions. For the bandwidth-as-a-resource scenario, this solution has the same result as provisioning extra bandwidth for all customers. That is, N+1 times the bandwidth is needed for N TVs 114.

A second proposal keeps track of individual members in a group. However, this proposal is not scalable. Further, this proposal does not solve the problem if some members do not report their membership in a group because they detect peers already in the same group.

Accordingly, it is an object of the present invention to obviate or mitigate at least some of the above-mentioned disadvantages.

BRIEF SUMMARY OF THE INVENTION

In accordance with an aspect of the present invention, there is provided a method for selecting a resource from a plurality of potential resources for providing a service in response to a service request. The method comprises the following steps. Aging services are determined by estimating which of the resources are likely to become available. One of the aging services is disconnected from its resource. The resource is then used for providing the service in the service request.

In accordance with a further aspect of the present invention, an oldest service is determined. The oldest service is defined as the service that is most likely to be disconnected from its resource. The oldest service is disconnected from its resource. The resource is then used for providing the service in the service request.

BRIEF DESCRIPTION OF THE DRAWINGS

An embodiment of the present invention will now be described by way of example only with reference to the following drawings in which.

DETAILED DESCRIPTION OF THE INVENTION

Figure 1:
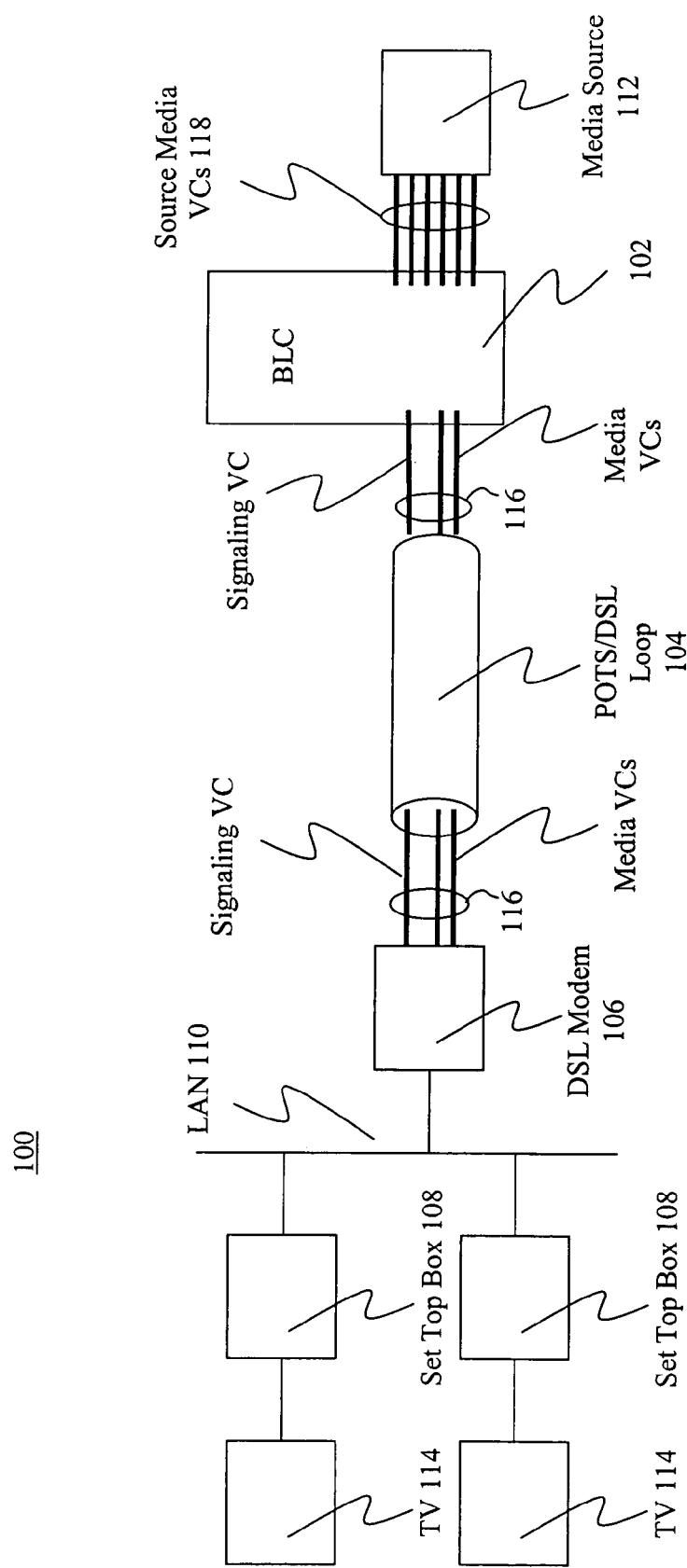
FIG. 1 is block diagram of a multicast system (prior art)

For convenience, like numerals in the description refer to like structures in the drawings. Further, the terms video stream and group are used interchangeably since a video stream is an example of a group. (Video streams are delivered to the BLC via the source VCs 118.) Similarly, the terms set top box and client are used interchangeably since a set top box is an example of a client.

Figure 2:
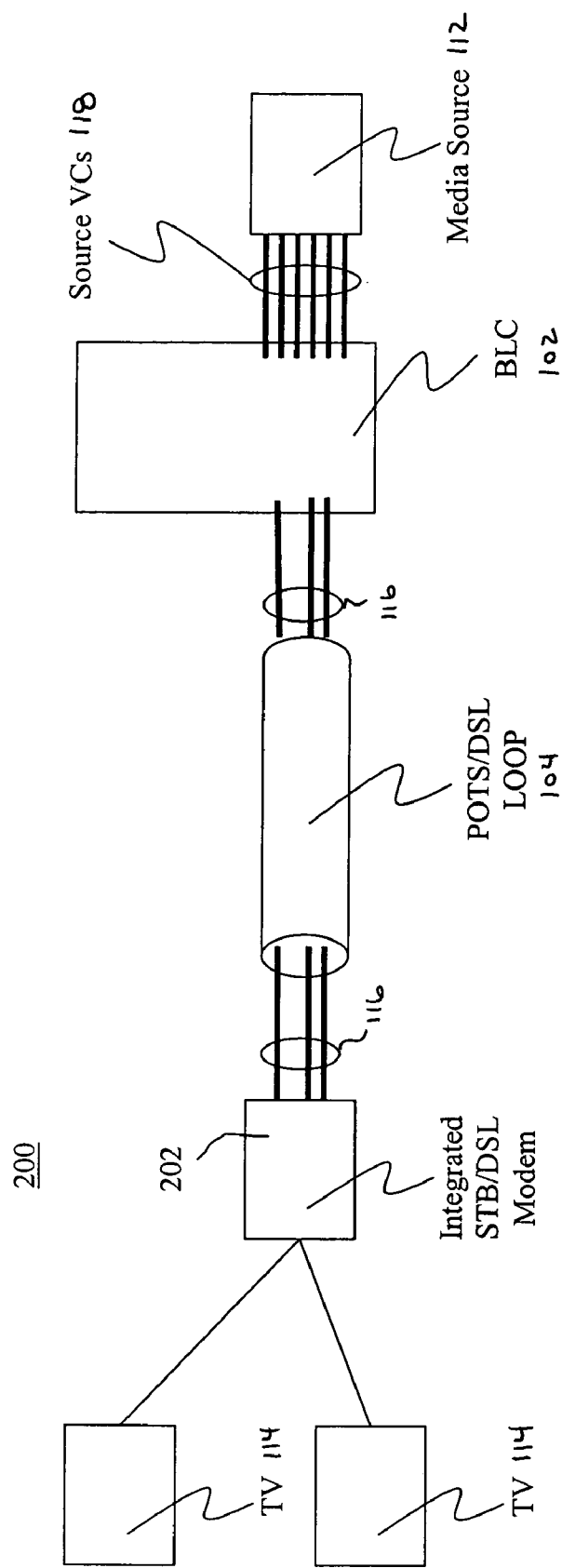
FIG. 2 is block diagram of an alternate multicast system (prior art)

Embodiments of the present invention may be implemented by an enhanced multicast capable BLC. The enhanced BLC may include a processor that executes a program to control its operation. The processor may be a general processor that executes a computer program, an application-specific integrated circuit (ASIC), a combination ASIC and processor, or similar. The program may be embodied in software, hardware or firmware as desired based on other design choices regarding the enhanced BLC. The enhanced BLC may otherwise be similar to the BLC 102 of FIG. 1 or FIG. 2. References to the BLC below may be considered to refer to embodiments of the enhanced BLC.

In the present embodiment, the reception of an IGMP Leave message triggers the normal leave behaviour. In addition to the normal leave, a Group Specific Query is transmitted back to the clients a predefined number of times, at a predefined interval. A Group Specific Query is defined in IGMP and is used to learn if a particular group has any members on an attached network. The purpose of this query is to solicit responses from members of the group to determine whether or not the group should be disconnected from the media VC 116. If no IGMP report is received for that group by the end of the last Group Specific Query, it is assumed that there are no members of the group present and the group is disconnected from the media VC 116. If, however, an IGMP report is received for that group, a member of the group is present, the IGMP Leave timers are cleared, and the group is not disconnected from the media VC 116. Thus, glitches resulting from the removal and reconnection of a media VC 116 as described with reference to the prior art are minimized.

When IGMP reports are received for a group that is not already being transmitted, the enhanced BLC looks for an available media VC 116 (or other resource) on which to send the group. If an available media VC 116 is found, it is used to transmit the group. However, as described with reference to the prior art, there are conditions under which no media VC 116 is available.

If no media VC 116 is available, the enhanced BLC attempts to create an available media VC 116 as follows. The counter and timer associated with the Group Specific Queries are used to determine if a group already being transmitted is aging. The term aging, as used herein, determines that the possibility exists that the group will be disconnected from the media VC 116 in the near future. In this example, a group is aging if a Group Specific Query has been sent, but a response has not yet been received. Further, the probability that a group will be disconnected increases in proportion to the time elapsed since the transmission of the first Group Specific Query. That is, that the group with the oldest Group Specific Query timer is the most likely to be disconnected.

Accordingly, the group having the oldest Group Specific Query timer is selected as the group to be disconnected from its media VC 116. The disconnected media VC 116 is then connected to the group requested in the received IGMP report. Thus, the present embodiment effectively turns a normal leave into a fast leave based on a reasonable heuristic when the demand for a media VC 116 is required.

Figure 3:
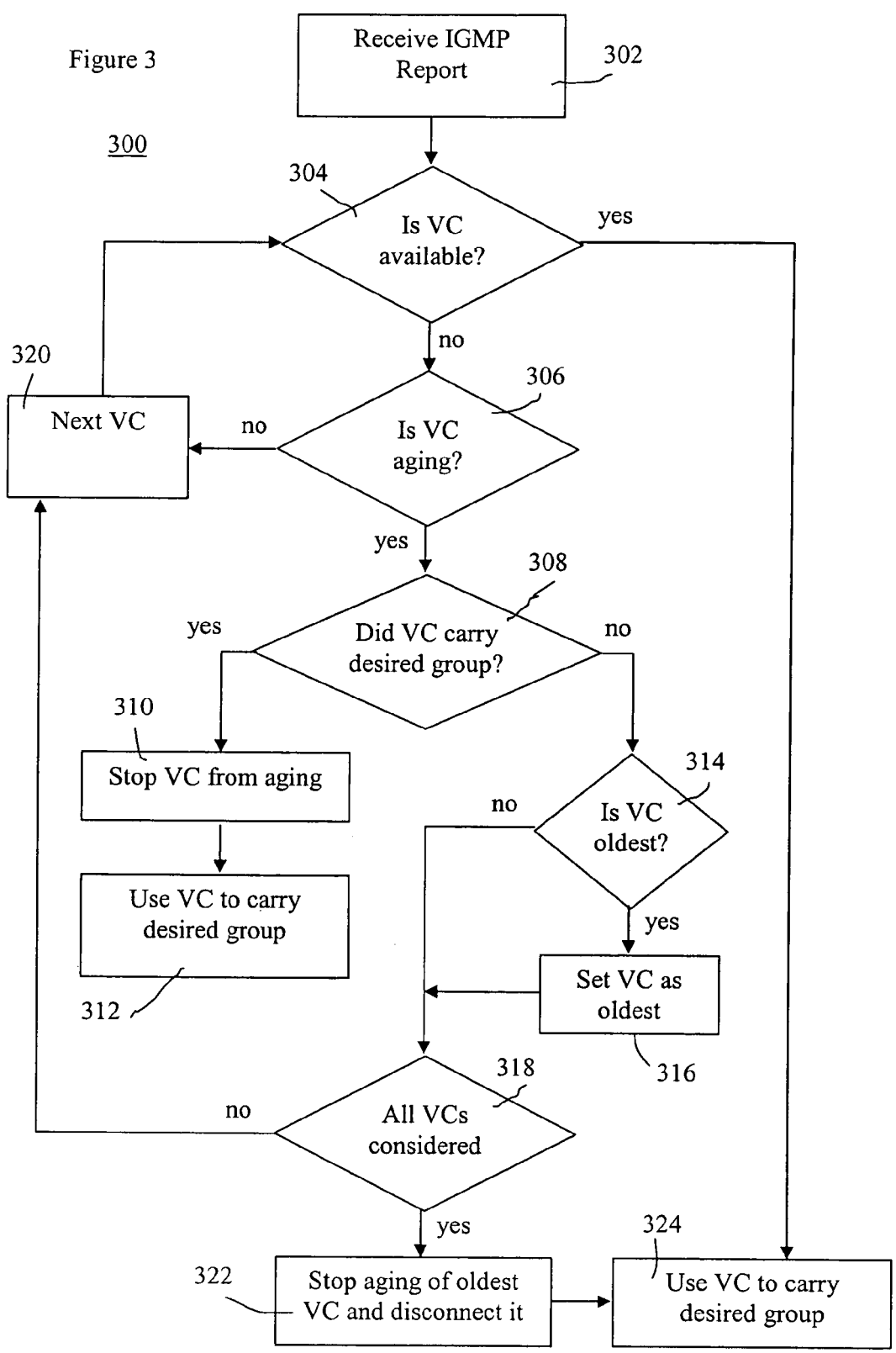
FIG. 3 is flow chart illustrating the operation of multicast system in accordance with an embodiment of the invention.

Referring to FIG. 3, a flow chart illustrating the operation of the present embodiment is shown generally by numeral 300. In step 302, the server receives the IGMP Report and determines that no other clients currently subscribe to the requested video stream. The operation begins with a first media VC 116 and proceeds to step 304. In step 304, it is determined whether or not the particular media VC 116 is available to transmit the requested video stream. If the media VC 116 is available, the operation proceeds to step 324 and the media VC 116 is used to transmit the video stream. If it is determined that the media VC 116 is not available, the operation proceeds to step 306.

In step 306, it is determined whether or not the video stream on the media VC 116 is aging. That is, it is determined whether or not there has been an IGMP Leave requested for the media VC 116. If the video stream on media VC 116 is not aging, then it is in use and the operation proceeds to step 320. If the video stream on media VC 116 is aging then there is the possibility that the media VC 116 will be disconnected shortly and the operation proceeds to step 308.

In step 308, it is determined if the aging video stream is the requested video stream. If the video stream is the requested video stream, the operation proceeds to step 310. In step 310, aging of the video stream is stopped. In the present embodiment, this is achieved by canceling the Group Specific Query timers and resetting the Group Specific Query counter. The operation then proceeds to step 312, and the media VC 116 continues to transmit the requested video stream. If the aging video stream is not the requested video stream, the operation proceeds to step 314.

In step 314, it is determined whether or not the aging video stream is older than all previous aging video streams. If the aging video stream is not older than all previous aging video streams, the operation proceeds to step 318. If the aging video stream is older than all previous aging video streams, the operation proceeds to step 316 and the media VC 116 carrying the video stream is set as the oldest media VC 116. The operation then proceeds to step 318.

In step 318, it is determined whether or not all media VCs 116 have been considered. If all media VCs 116 have not been considered, the operation proceeds to step 320; otherwise it proceeds to step 322. In step 320, the operation proceeds to the next media VC 116 and then returns to step 304. In step 322, the aging of the video stream on the oldest media VC 116 is stopped and is disconnected from the associated media VC 116. In step 324, the available media VC 116 is used to transmit the requested video stream.

In the operation described above, the algorithm to determine if a media VC 116 is the oldest can be based on the age of the Group Specific Queries. The algorithm can be further enhanced by looking at a number of missing responses to General Queries if no media VCs are marked as old based on the Group Specific Query timers.

Although the present embodiment of the invention has been described with respect to multicast video distribution over ATM, the concepts apply to other technologies where there is an explicit association between the availability of a resource, such as a virtual circuit or bandwidth, and the ability to provide a requested service, IGMP group or media stream, as will be appreciated by a person skilled in the art.

Figure 4:
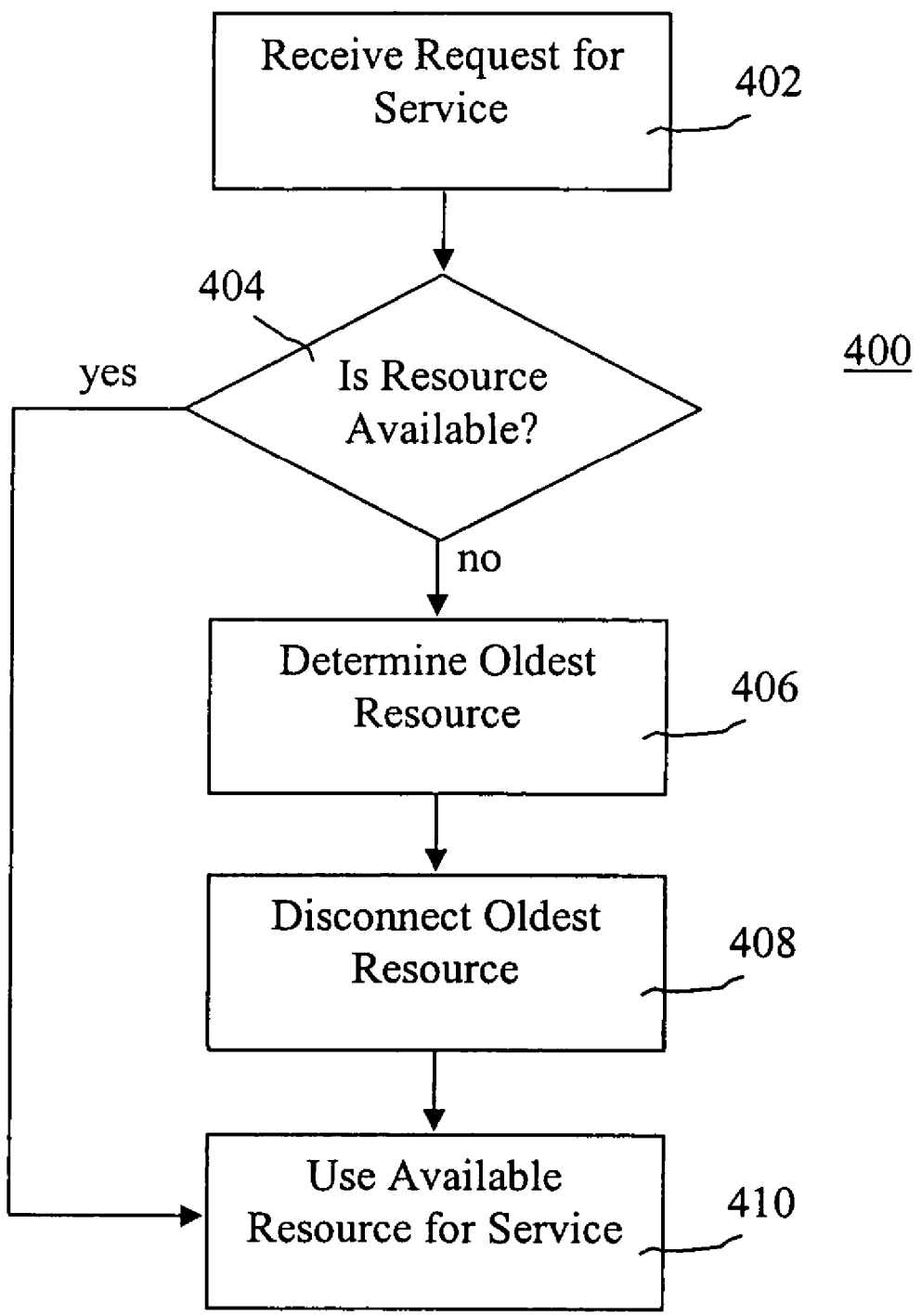
FIG. 4 is flow chart illustrating the operation of multicast system in accordance with an alternate embodiment of the invention.

Accordingly, referring to FIG. 4, a flow chart illustrating the general operation of selecting a limited resource based on service requests is shown generally by numeral 400. In step 402, a request for service is received. In step 404, it is determined whether or not a resource is available for providing the requested service. If the resource is available, the operation proceeds to step 410 in which the resource is used to provide the service. If a resource is not available, the operation proceeds to step 406. In step 406, the service that is the oldest and most likely to be unnecessary is determined. In step 408, this oldest service is disconnected from its current resource, which is used to provide the requested service.

Using this process, the operation described above may be extended to resources other than ATM VCs and services other than multicast groups. It should be noted that control protocols other than IGMP may have different algorithms to determine which of any service currently being provided is the oldest, as will be appreciated by a person skilled in the art.

Further, it should be noted that resource limitations may include bandwidth availability limitations in addition to the number of VCs available. This process may also be used to limit the bandwidth usage of a group delivery system in accordance with the bandwidth requirement for the number of provisioned groups. This may even be performed in the presence of a non-bandwidth limited media, thus making bandwidth usage more efficient.

Although the invention has been described with reference to certain specific embodiments, various modifications thereof will be apparent to those skilled in the art without departing from the spirit and scope of the invention as outlined in the claims appended hereto.

What is claimed is:

1. A method for selecting a resource from a plurality of potential resources for providing a service in response to a service request, the method comprising the steps of:
    providing a poller for polling at least two of the plurality of potential resources;
    providing a timer initiater for initiating a timer for each of the at least two of the plurality of potential resources at the time of said polling;
    providing a timer reset for resetting the timer when said potential resource responds to said poller with a signal representing that the potential resource is still in use;
    providing a time out disconnect for disconnecting a one of said at least two of the plurality of potential resources when the timer associated with said one potential resource reaches a predetermined time without being reset;
    determining aging services by estimating which of the potential services having a timer running is likely to be disconnected;
    disconnecting a one of the aging services from its associated resource prior to the expiration of the timer; and
    using the disconnected resource for providing the service in the service request.

2. A method for aging limited resources, the method comprising:
    providing a plurality of resources for broadcasting a service over each resource;
    querying each of said plurality of resources to determine whether each of the resources is in use to broadcast a service;
    categorizing each queried resource as an aging service;
    initiating a timer for expiring each aging service if the aging service does not respond within a predetermined time period;
    receiving a request to broadcast a requested service;
    if one of said potential resources is broadcasting the requested service, terminating aging of the one of said plurality of resources;

if none of said potential resources is broadcasting the requested service, disconnecting the resource associated with an aging service from one of the aging services, and broadcasting the requested service over the disconnected resource.

3. The method claim 2, wherein said resource is a virtual circuit.

4. The method claim 2, wherein said resource is a virtual channel connected between a band carrier loop and a set top box.

5. The method claim 2, wherein said resource is a virtual channel connected across a POTS/DSL Loop between a band carrier loop and a set top box.

6. The method claim 2, wherein said resource is a media virtual channel and said service is a digital video broadcast.

7. The method claim 2, wherein said resource is a media virtual channel and said service is a digital video broadcast.

8. The method claim 2, wherein said aging is a time-out based disconnect.

9. The method claim 2, wherein said aging is a time-out based disconnect as described by IGMPv1.

10. The method of claim 2, wherein the aging service selected to be disconnected is an oldest service for which the potential disconnect is most likely to occur.

11. The method of claim 10, wherein the oldest service is determined by non-responsiveness to a transmitted query.

* * * * *